US011365782B2

(12) United States Patent
Talon et al.

(10) Patent No.: US 11,365,782 B2
(45) Date of Patent: Jun. 21, 2022

(54) ROTARY DAMPER, PARTICULARLY FOR VEHICLE SUSPENSION

(71) Applicant: MARELLI SUSPENSION SYSTEMS ITALY S.P.A., Corbetta (IT)

(72) Inventors: Benjamin Talon, Cahors (FR); Piero Antonio Conti, Asti (IT); Fabio Cotto, Turin (IT); Giordano Greco, Turin (IT)

(73) Assignee: MARELLI SUSPENSION SYSTEMS ITALY S.p.A., Corbetta (IT)

( * ) Notice: Subject to any disclaimer, the term of this patent is extended or adjusted under 35 U.S.C. 154(b) by 220 days.

(21) Appl. No.: 16/770,234

(22) PCT Filed: Dec. 7, 2018

(86) PCT No.: PCT/EP2018/083960
§ 371 (c)(1),
(2) Date: Jun. 5, 2020

(87) PCT Pub. No.: WO2019/110794
PCT Pub. Date: Jun. 13, 2019

(65) Prior Publication Data
US 2021/0164532 A1    Jun. 3, 2021

(30) Foreign Application Priority Data

Dec. 7, 2017  (IT) .......................... 102017000141538

(51) Int. Cl.
*F16F 9/06*    (2006.01)
*F16F 9/34*    (2006.01)
(Continued)

(52) U.S. Cl.
CPC ................ *F16F 9/065* (2013.01); *F16F 9/34* (2013.01); *F16F 9/585* (2013.01); *F16F 13/007* (2013.01);
(Continued)

(58) Field of Classification Search
CPC .... F16F 9/065; F16F 9/34; F16F 9/585; F16F 13/007; F16H 21/54
See application file for complete search history.

(56) References Cited

U.S. PATENT DOCUMENTS 3,784,363 A * 1/1974 Flannelly ............... G01C 19/02
74/5.34
2008/0214348 A1* 9/2008 Hasegawa ............. F16H 37/043
475/80
2008/0277894 A1 11/2008 Runkel

FOREIGN PATENT DOCUMENTS

BE          423599 A    10/1937
EP        0422338 A2     4/1991
GB         340563 A      1/1931

OTHER PUBLICATIONS

International Search Report and Written Opinion of the International Searching Authority for PCT International Application No. PCT/EP2018/083960 dated Feb. 22, 2019.

* cited by examiner

*Primary Examiner* — Vishal R Sahni
(74) *Attorney, Agent, or Firm* — Howard & Howard Attorneys PLLC

(57) ABSTRACT

A rotary damper includes a rotating input member rotating about a rotation axis; a first cylinder and a second cylinder coaxially arranged on opposite sides of the rotation axis; a first and a second pistons slidable inside the first and second cylinders and defining a first and a second working chambers containing incompressible working fluids, respectively; motion conversion mechanisms converting the rotary motion of the rotating input member about the rotation axis into reciprocating motion of the first and second pistons; a third cylinder; a fourth cylinder; and a third and fourth pistons, slidable inside the third and fourth cylinders, respectively and separating the inner volume of the respective (Continued)

cylinder into a respective main chamber in fluid communication with the first working chamber and auxiliary chambers; and the second working chamber and auxiliary chambers respectively.

19 Claims, 11 Drawing Sheets

(51) Int. Cl.
*F16F 9/58* (2006.01)
*F16F 13/00* (2006.01)
*B60G 13/08* (2006.01)
*B60G 13/14* (2006.01)
*B60G 15/06* (2006.01)
*B60G 17/08* (2006.01)
*F16H 21/54* (2006.01)

(52) U.S. Cl.
CPC .............. *B60G 13/08* (2013.01); *B60G 13/14* (2013.01); *B60G 15/061* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2800/162* (2013.01); *F16F 2222/12* (2013.01); *F16F 2228/066* (2013.01); *F16F 2230/00* (2013.01); *F16F 2230/007* (2013.01); *F16F 2230/42* (2013.01); *F16F 2234/02* (2013.01); *F16H 21/54* (2013.01)

ROTARY DAMPER, PARTICULARLY FOR VEHICLE SUSPENSION

CROSS-REFERENCE TO RELATED APPLICATIONS

The present application is a National Stage of PCT International Patent Application No. PCT/EP2018/083960, filed Dec. 7, 2018, which claims priority to and all the benefits of Italian Patent Application No. 102017000141538, filed on Dec. 7, 2017 both of which are hereby expressly incorporated herein by reference in their entirety.

BACKGROUND OF THE INVENTION

1. Field of the Invention

The present invention relates in general to a rotary damper for dampening the rotary motion of a rotating mechanical member, such as an oscillating lever or arm, and in particular to a rotary damper for dampening the rotary motion of a suspension arm in a vehicle suspension. However, the rotary damper of the present invention is not limited to this particular application, but may be applied to any mechanical system where it is required to dampen the rotary motion of a mechanical member.

More specifically, the rotary damper of the present invention comprises:

a rotating input member rigidly connected to the rotating mechanical member to rotate with the rotating mechanical member about an axis of rotation;

a first cylinder and a second cylinder coaxially arranged on opposite sides of the axis of rotation;

a first piston and a second piston which are slidably mounted inside the first cylinder and the second cylinder, respectively, and define with the first cylinder and the second cylinder a first working chamber and a second working chamber, respectively, said first and second working chambers containing a first working fluid and a second working fluid, respectively, both being incompressible fluids; and motion conversion mechanisms arranged between the rotating input member and the first and second pistons to convert the rotary motion of the rotating input member about the axis of rotation into reciprocating motion of the first and second pistons in phase with each other, whereby as a result of the rotary motion of the rotating input member in a first direction about the axis of rotation the volume of the first working chamber is reduced and the volume of the second working chamber is increased, while as a result of the rotary motion of the rotating input member in a second direction, opposite to the first direction, about the axis of rotation the volume of the first working chamber is increased while the volume of the second working chamber is reduced.

2. Description of the Related Art

A rotary damper of the above-described type is known, for example, from GB 340 563. According to the technical solution provided therein, the rotary damper has a by-pass chamber which extends parallel to the first and second cylinders and communicates both with the first working chamber and with the second working chamber via respective small holes, so that the working fluid (formed by a liquid) contained in the first and second working chambers can flow from the first working chamber to the second one, and vice versa, through the by-pass chamber. The damping level, obtained by exploiting the flow of the working fluid through the by-pass chamber, can be determined by an adjustable screw plug, which in conjunction with one of the two small holes, provides a manually-adjustable flow control valve. In this way, the same regulation is possible for the damping level in both the rebound and compression phases.

However, the prior-known rotary damper has several drawbacks. First, it does not guarantee easy and complete filling of the working volume with the working fluid. Second, it does not compensate an inevitable expansion of the working fluid caused by temperature increase during operation. Such an expansion of the working fluid may cause excessive pressure within the damper and potentially lead to the burst of the damper itself. Furthermore, it does not add a spring effect to the rotating mechanical member, whose rotation has to be dampened, unlike any conventional damper used in vehicle suspensions. Finally, as already mentioned, it does not allow to adjust the damping level independently in the compression and rebound phases.

A rotary damper of the above-mentioned type is also known from BE 423 599. Also in this case the first and second working chambers are in fluid communication with each other, so that the working fluid contained in the first and second working chambers can flow from one chamber to the other. Moreover, the rotary damper according to BE 423 599 further comprises:

a third piston slidably arranged inside a third cylinder and separating the inner volume of said cylinder into a first main chamber, which is connected to the first working chamber via a first check valve, and a first auxiliary chamber, which accommodates a spring acting on the third piston against the pressure force due to the pressure of the fluid in the first main chamber; and a fourth piston slidably arranged inside a fourth cylinder and separating the inner volume of said cylinder into a second main chamber, which is connected to the second working chamber via a second check valve, and a second auxiliary chamber, which accommodates a spring acting on the fourth piston against the pressure force due to the pressure of the fluid in the second main chamber;

wherein the first and second auxiliary chambers are in fluid communication with each other, as well as with the first and second working chambers and with the first and second main chambers.

Also the above-described prior-known rotary damper suffers from the drawbacks mentioned in connection with GB 340 563, namely, it does not guarantee complete filling of the working volume with the working fluid, it does not compensate the thermal expansion of the working fluid caused by temperature increase during operation, and it is not able to add a spring effect to the mechanism.

SUMMARY OF THE INVENTION

It is therefore an object of the present invention to provide a rotary damper that overcomes the drawbacks of the prior art.

This and other objects are fully achieved according to the present invention by a rotary damper as described and claimed herein.

Advantageous embodiments of the invention are also described.

In summary, the present invention is based on the idea of providing a rotary damper, wherein the first and second working chambers are fluidically separated from each other and the first and second auxiliary chambers are also fluidically separated from each other, as well as from the first and second working chambers, whereby the first working fluid is prevented from flowing from the first working chamber both into the second working chamber and into the first and second auxiliary chambers, and whereby the second working fluid is prevented from flowing from the second working chamber both into the first working chamber and into the first and second auxiliary chambers.

Since the first and second working chambers are not in fluid communication with each other, and no working fluid flows between such two chambers, changes in volume of the first and second working chambers, due to the linear motion of the first and second pistons caused by rotation of the rotating input member, and leading the first and second working fluids to flow into, or out of, the first and second working chambers, respectively, are compensated by movement of the third and fourth pistons, respectively, inside the respective third and fourth cylinders.

This allows to obtain easy and complete filling of the working volumes with the first and second working fluids, and to compensate the inevitable expansion of the first and second working fluid caused by the increase of the temperature during operation.

This also allows to provide the rotary damper with a spring effect by suitably setting the elastic forces (in terms of preload and stiffness) applied by the first and second members.

Moreover, a double spring stiffness effect can be given to the rotary damper, depending on the amplitude of the rotation of the rotating input member, as explained in detail in the following description.

A same incompressible fluid may be used as first and second working fluids.

According to an embodiment of the present invention, said first and second spring members are formed by first and second compressible fluids, respectively, each filling a respective first and second auxiliary chambers. Adjustment of the elastic forces applied onto the third and fourth pistons may be obtained by suitably setting the pressure levels of the first and second compressible fluids in the respective auxiliary chambers. To this end, the damper may comprise a pneumatic compressor and a set of pneumatic valves to vary the pressures of the first and second compressible fluids in the first and second auxiliary chambers. In this way, in case of application of the rotary damper to a vehicle suspension, it would also be possible to vary the vehicle ride height.

The first and second spring members may also be formed by elastic mechanical elements, including coil springs or members of elastomeric material, instead of compressible fluid.

BRIEF DESCRIPTION OF THE DRAWINGS

Further features and advantages of the present invention will become apparent from the following detailed description, given purely by way of non-limiting example with reference to the appended drawings, wherein.

DETAILED DESCRIPTION OF THE INVENTION

Figure 1:
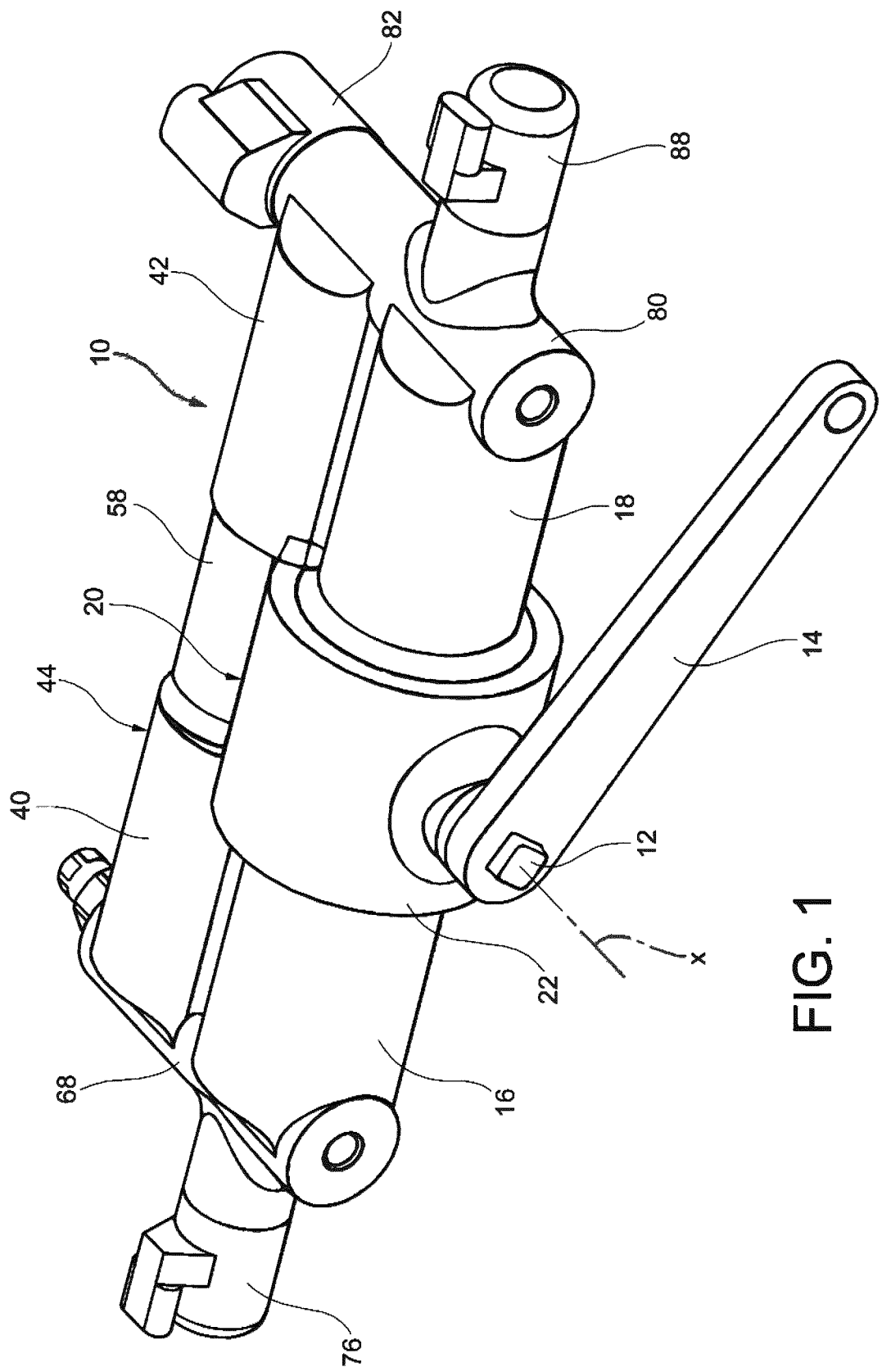
FIG. 1 is a perspective view of a rotary damper according to an embodiment of the present invention, the rotary damper being connected to a suspension arm.

The rotary damper of the present invention is particularly designed for a vehicle suspension, and will be described hereafter with reference to this specific application. It is to be understood that such application is merely provided by way of example and is not to be regarded as limiting the scope of the present invention. Other possible applications for a rotary damper according to the invention may be military vehicles, tanks, airplanes, helicopters, trains, robots, etc.

With reference first to FIGS. 1 to 5, a rotary damper (hereinafter simply referred to as "damper") according to an embodiment of the present invention is generally indicated with 10.

The damper 10 comprises a rotating input member 12 rigidly connected to a rotating mechanical member 14 to rotate with the latter about an axis of rotation x.

In the illustrated embodiment, the rotating input member 12 and the rotating mechanical member 14 are a shaft and a suspension arm, respectively, and will be referred to hereinafter, for the sake of simplicity, as shaft 12 and suspension arm 14, respectively. It is to be understood that members 12 and 14 may be formed by other suitable members, depending on the specific application of the damper 10.

Figure 3:
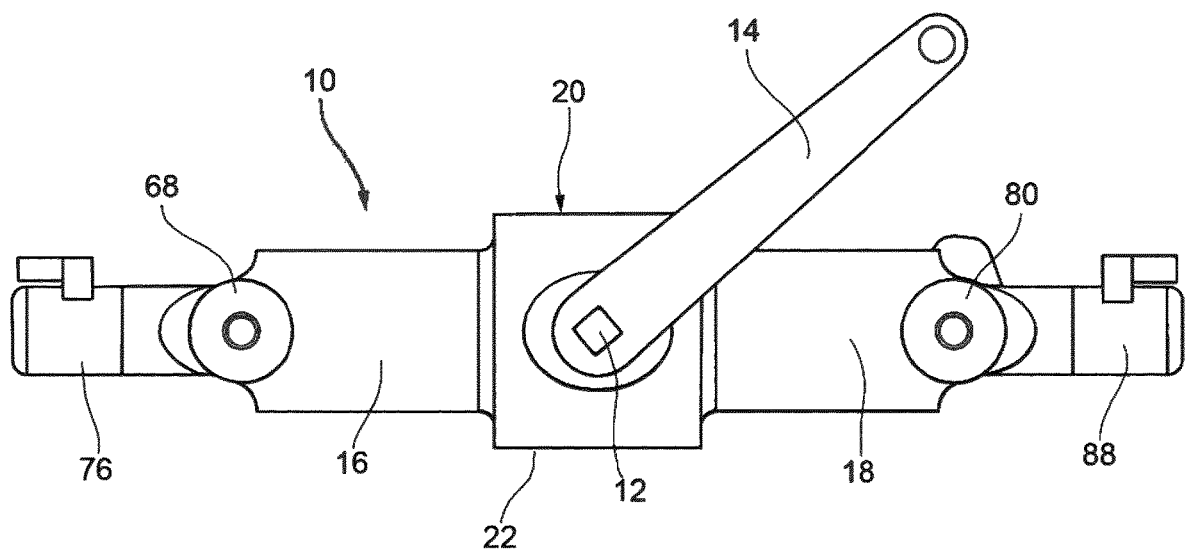
FIG. 3 is a perspective view, partially in phantom, of the rotary damper of FIG. 1, with the suspension arm in said first position.
Figure 2:
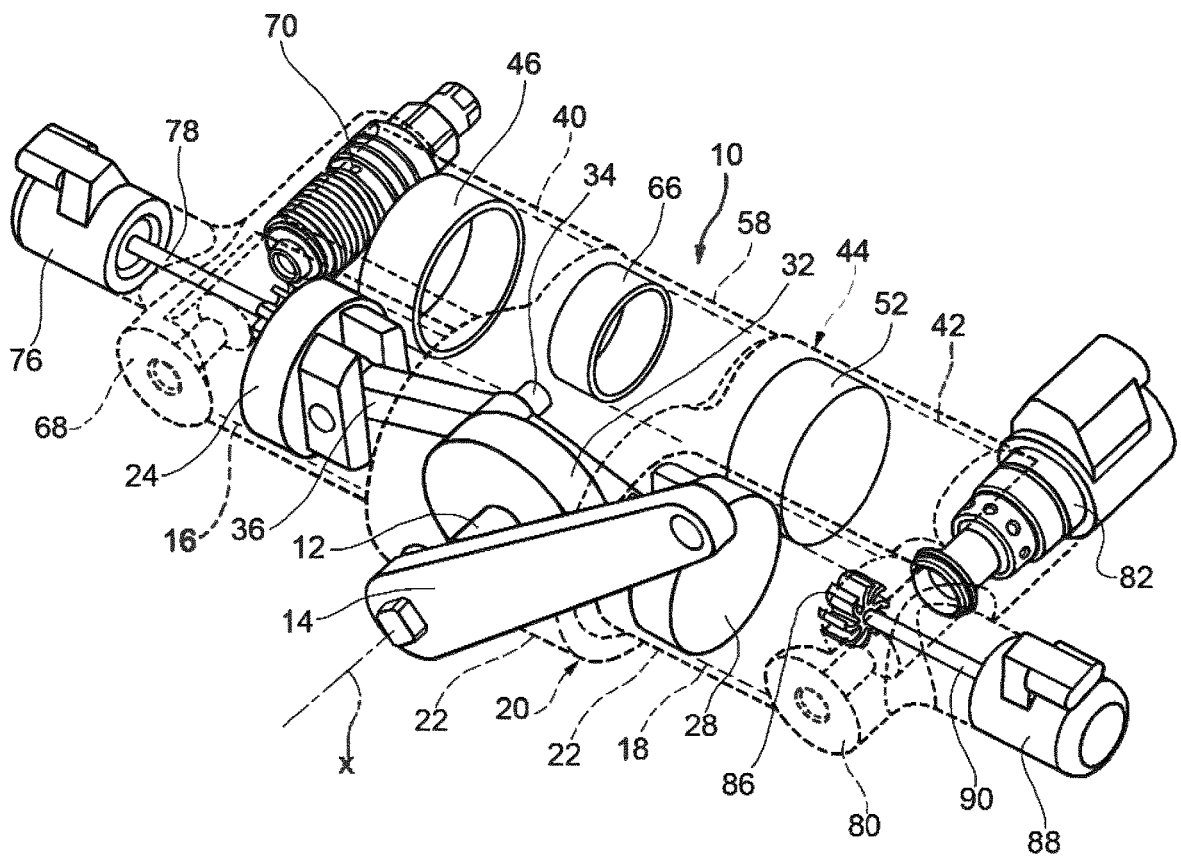
FIG. 2 is a side view of the rotary damper of FIG. 1 in a first position of the suspension arm.
Figure 4:
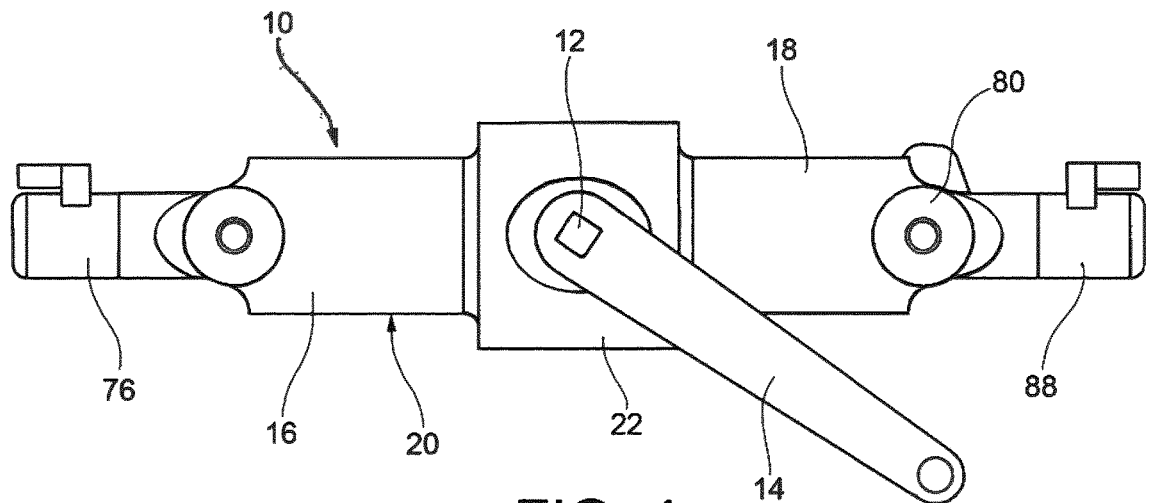
FIG. 4 is a side view of the rotary damper of FIG. 1 in a second position of the suspension arm.
Figure 5:
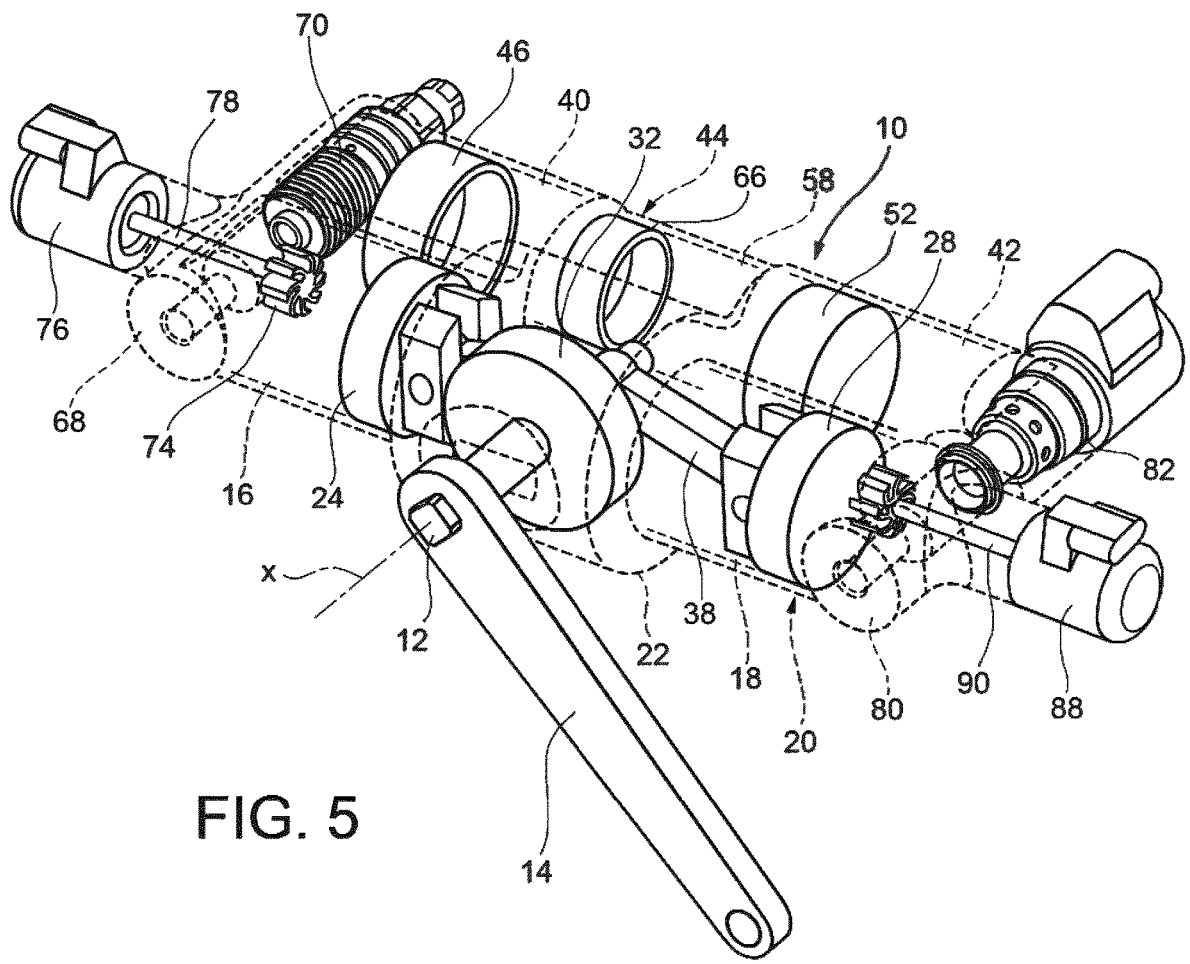
FIG. 5 is a perspective view, partially in phantom, of the rotary damper of FIG. 1, with the suspension arm in said second position.

As a result of the relative vertical movement of the vehicle wheel (not shown) in either direction with respect to the vehicle body (also not shown), the suspension arm 14, and therefore also the shaft 12, rotate in either direction about the axis of rotation x. More specifically a so-called compression movement of the vehicle wheel, i.e. a movement of the vehicle wheel towards the vehicle body, brings about a rotary movement of the suspension arm 14 in a first direction (a counter-clockwise direction, with respect to the point of view of a person looking at FIGS. 1 to 5) about the axis of rotation x, so that the suspension arm 14 rotates upwards until it reaches a first position as shown in FIGS. 2 and 3, whereas a so-called rebound movement of the vehicle wheel, i.e. a movement of the vehicle wheel away from the vehicle body, brings about a rotary movement of the suspension arm 14 in a second direction (a clockwise direction, with respect to the point of view of a person looking at FIGS. 1 to 5) about the axis of rotation x, so that the suspension arm 14 rotates downwards until it reaches a second position as shown in FIGS. 4 and 5.

The damper 10 further comprises a first cylinder 16 and a second cylinder 18 coaxially arranged on opposite sides of the axis of rotation x. The axis of the first and second cylinders 16 and 18 is indicated with y.

In the illustrated embodiment, the first and second cylinders 16 and 18 are formed by a same tubular casing, which is generally indicated with 20, but they may alternatively be formed by separate casings. In the illustrated embodiment, the casing 20 also forms a central portion 22 where the shaft 12 is supported for rotation about the axis of rotation x in a manner generally known in the art. In case of application to vehicle suspensions, the casing of the damper may be fully integrated into the frame of the vehicle, providing a significant advantage in terms of packaging.

The first and second cylinders 16 and 18 may have the same internal diameter and the same length.

A first piston 24 is slidably mounted inside the first cylinder 16 to reciprocate along the axis y. The first piston 24 defines with the first cylinder 16 a first working chamber 26, whose volume changes as the first piston 24 moves along the axis y. The first working chamber 26 is filled with a first working fluid, which is an incompressible fluid, such as oil.

Likewise, a second piston 28 is slidably mounted inside the second cylinder 18 to reciprocate along the axis y. The second piston 28 defines with the second cylinder 18 a second working chamber 30, whose volume changes as the second piston 28 moves along the axis y. The second working chamber 30 is filled with a second working fluid, which is an incompressible fluid, such as oil. The same fluid, e.g. the same oil, may be used both as first working fluid and as second working fluid. The second working chamber 30 is fluidically separated from the first working chamber 26 so that flow of the first and second working fluids between the first and second working chambers 26 and 30 is always prevented.

The damper 10 further comprises a motion conversion mechanism arranged between the shaft 12 and the first and second pistons 24 and 28 to convert the rotary motion of the shaft 12 about the axis of rotation x into reciprocating motion of the first and second pistons 24 and 28 in phase with each other, i.e. in the same direction along the axis y.

In the illustrated embodiment, during the compression phase the rotary motion of the shaft 12, and therefore of the suspension arm 14, in the first direction (counter-clockwise direction) about the axis of rotation x is converted by the motion converting mechanism into a linear motion of the first and second pistons 24 and 28 along the axis y to the left, whereby the volume of the first working chamber 26 is reduced while the volume of the second working chamber 30 is increased. On the other hand, during the rebound phase the rotary motion of the shaft 12, and therefore of the suspension arm 14, in the second direction (clockwise direction) about the axis of rotation x is converted by the motion converting mechanism into a linear motion of the first and second pistons 24 and 28 along the axis y to the right, whereby the volume of the second working chamber 30 is reduced while the volume of the first working chamber 26 is increased.

In the illustrated embodiment, the motion conversion mechanism comprises a wheel 32 rigidly connected to the shaft 12 for rotation therewith about the axis of rotation x, an eccentric pin 34 fixed to the wheel 32 at a distance from the axis of rotation x, and a pair of connecting rods 36 and 38 connecting the first and second pistons 24 and 28, respectively, with the eccentric pin 34. A different configuration of the motion conversion mechanism may be envisaged, provided it converts the rotary motion of the shaft 12 about the axis of rotation x into an in-phase linear motion of the first and second pistons 24 and 28 along the axis y.

The damper 10 further comprises a third cylinder 40 and a fourth cylinder 42.

In the illustrated embodiment, the third and fourth cylinders 40 and 42 are arranged coaxially with each other. The axis (indicated with y') of the third and fourth cylinders 40 and 42 is preferably directed parallel to the axis y of the first and second cylinders 16 and 18.

The third and fourth cylinders 40 and 42 may be arranged next to the first and second cylinders 16 and 18, respectively. More specifically, in the illustrated embodiment the third and fourth cylinders 40 and 42 are formed by a same tubular casing 44, which is arranged next to, and also parallel to, the tubular casing 20 forming the first and second cylinders 16 and 18, whereby the damper 10 has a generally flat twin-tube configuration.

The configuration described and illustrated herein is not essential for the purposes of the invention and does not therefore limit the scope of the invention. Other configurations are possible, but are not disclosed herein for the sake of conciseness.

Figure 6:
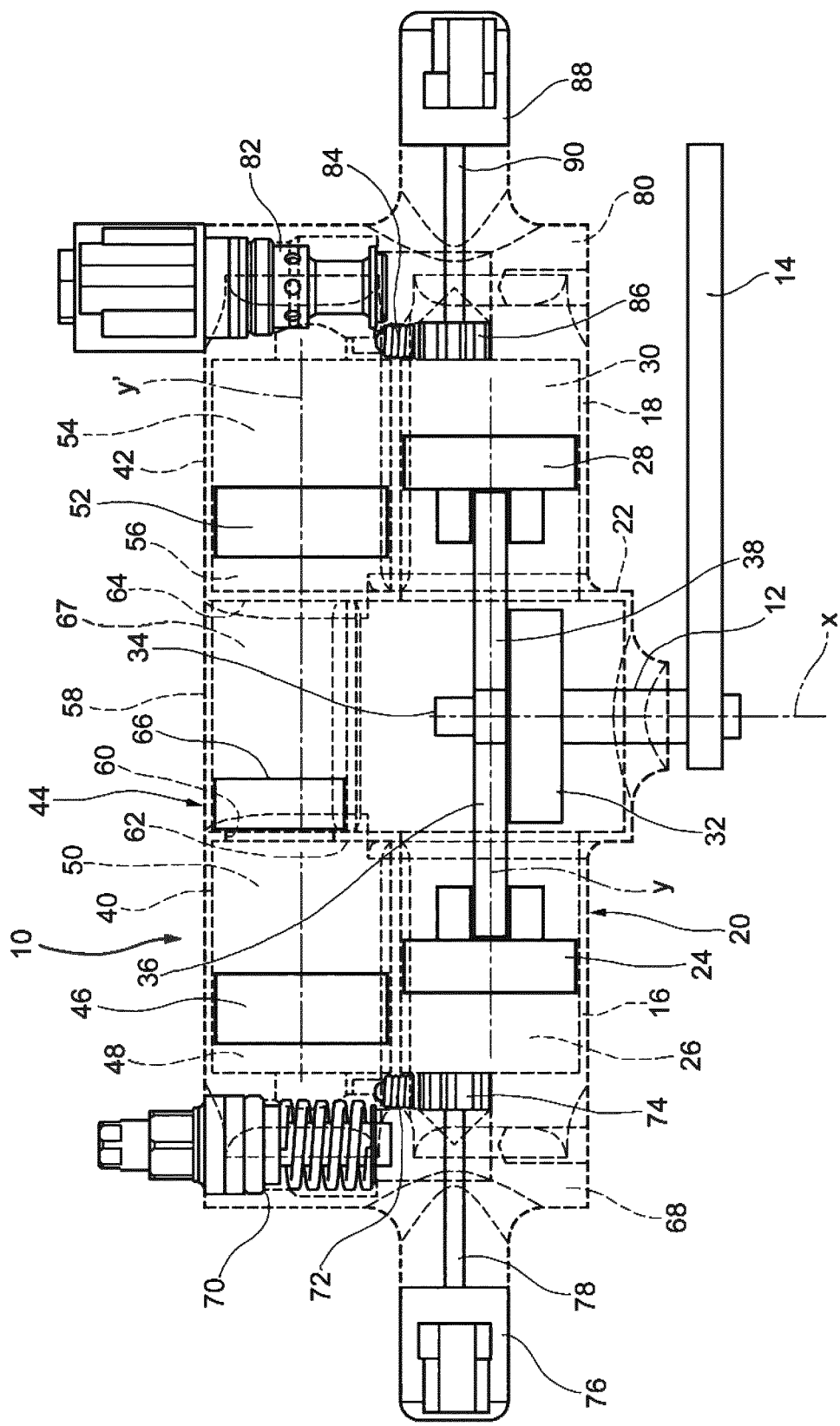
FIG. 6 is a cutaway view from above of the rotary damper of FIG. 1, with the suspension arm in a middle position between said first and second positions.
Figure 7:
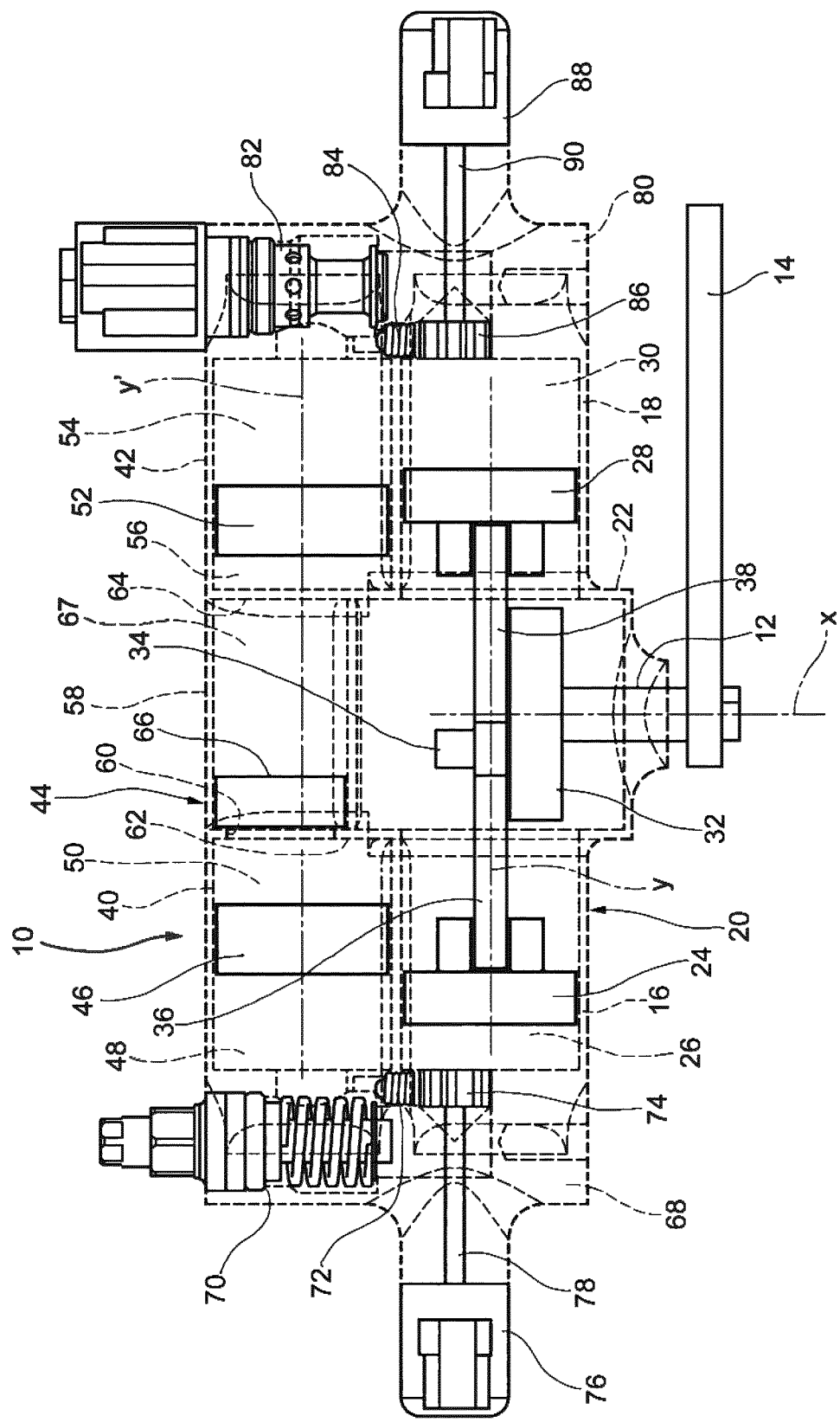
FIG. 7 is a cutaway view from above of the rotary damper of FIG. 1, with the suspension arm in said first position.
Figure 8:
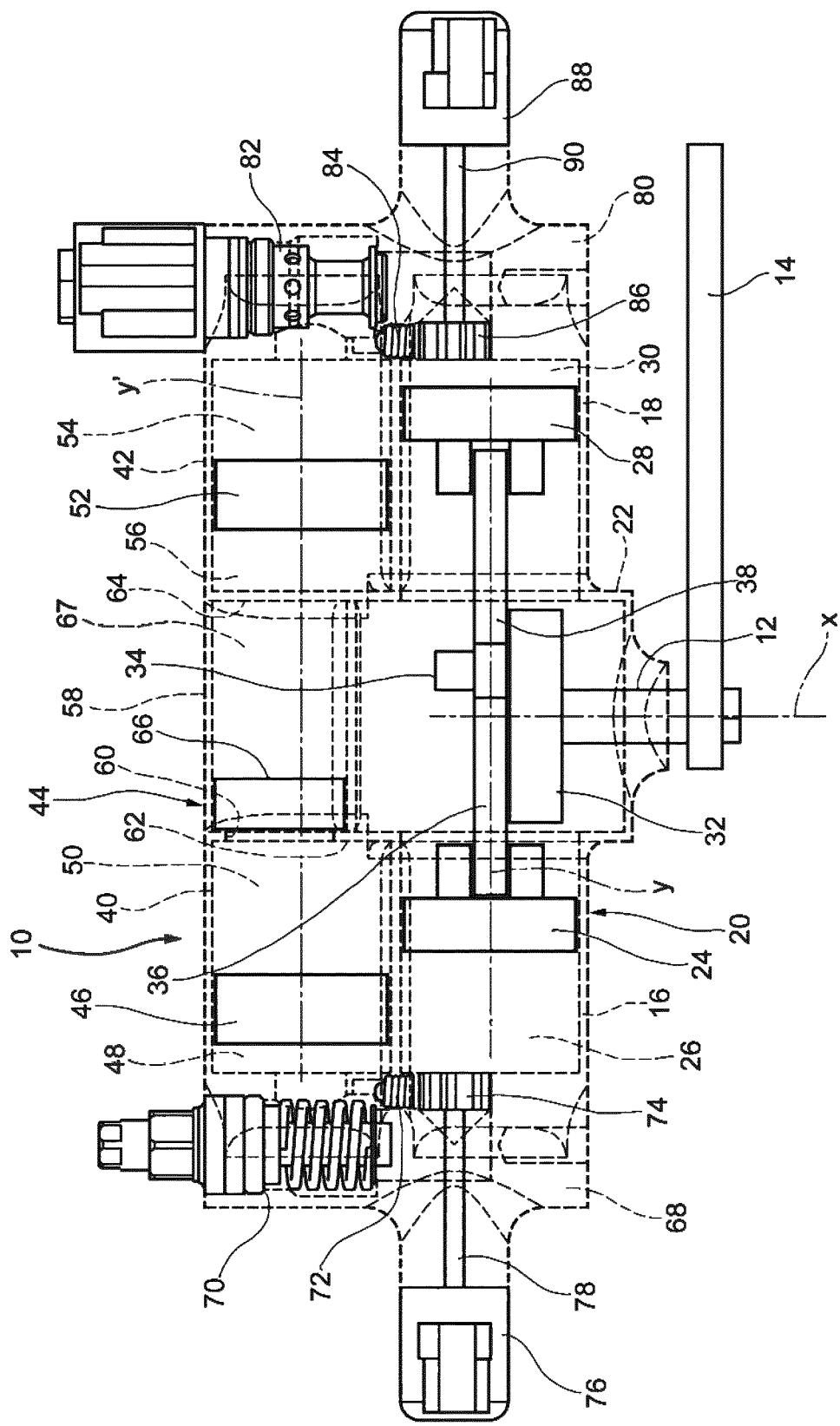
FIG. 8 is a cutaway view from above of the rotary damper of FIG. 1, with the suspension arm in said second position.

With reference to FIGS. 6 to 8, a third piston 46 is slidably arranged inside the third cylinder 40 and separates the inner volume of the third cylinder 40 into two chambers 48 and 50, hereinafter referred to as the first main chamber and the first auxiliary chamber, respectively.

The first main chamber 48 is in fluid communication with the first working chamber 26 and contains the first working fluid. Due to the pressure of the first working fluid in the first main chamber 48, a pressure force is applied onto the third piston 46 tending to move the third piston 46 to reduce the volume of the first auxiliary chamber 50 (i.e. to move the third piston 46 to the right, with respect to the point of view of a person looking at FIGS. 6 to 8).

The first auxiliary chamber 50 contains a first spring member arranged to apply onto the third piston 46 an elastic force to the left, i.e. an elastic force acting against the pressure force applied onto the third piston 46 by the pressure of the first working fluid in the first main chamber 48.

The third piston 46 is a floating piston, which slides inside the third cylinder 40 depending on the resultant force between the above-mentioned pressure force and elastic force applied onto it.

According to an embodiment of the present invention, as shown in FIGS. 1 to 11, the first auxiliary chamber 50 is filled with a first compressible fluid (i.e. air or gas) acting as first spring member.

Figure 12:
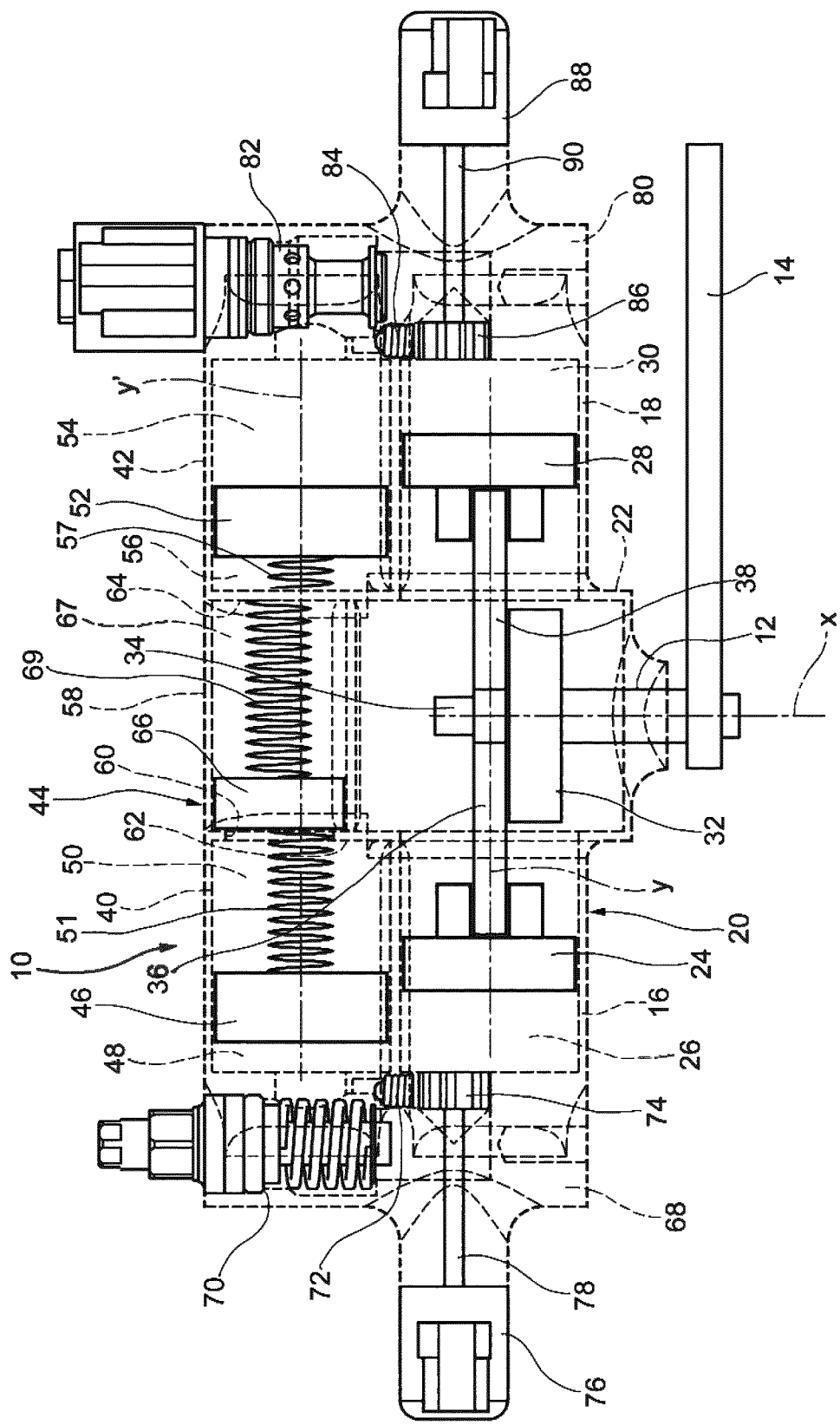
FIG. 12 is a perspective view, partially in phantom, of a rotary damper according to a further embodiment of the present invention.

Alternatively, as shown in FIG. 12, the first auxiliary chamber 50 contains a first elastic mechanical element 51, such as a coil spring. The first elastic mechanical element may also be a member of elastomeric material.

The arrangement is such that during the above-mentioned compression phase, when the volume of the first working chamber 26 decreases as a result of rotation of the shaft 12 in the first direction, flow of the first working fluid from the first working chamber 26 to the first main chamber 48 causes the volume of the first main chamber 48 to increase and therefore the third piston 46 to move to the right (according to the point of view of a person looking at FIGS. 6 to 8) to reduce the volume of the first auxiliary chamber 50, thus compressing the first compressible fluid, or the first elastic mechanical element 51, contained therein.

Still with reference to FIGS. 6 to 8, a fourth piston 52 is slidably arranged inside the fourth cylinder 42 and separates the inner volume of the fourth cylinder 42 into two chambers 54 and 56, hereinafter referred to as second main chamber and second auxiliary chamber, respectively.

The second main chamber 54 is in fluid communication with the second working chamber 30 and contains the second working fluid. Due to the pressure of the second working fluid in the second main chamber 54, a pressure force is applied onto the fourth piston 52 tending to move the fourth piston 52 to reduce the volume of the second auxiliary chamber 56 (i.e. to move the fourth piston 52 to the left, with respect to the point of view of a person looking at FIGS. 6 to 8).

The second auxiliary chamber 56 contains a second spring member arranged to apply onto the fourth piston 52 an elastic force to the right, i.e. an elastic force acting against the pressure force applied onto the fourth piston 52 by the pressure of the second working fluid in the second main chamber 54.

The fourth piston 52 is, like the third piston 46, a floating piston, which slides inside the fourth cylinder 42 depending on the resultant force between the above-mentioned pressure force and elastic force applied onto it.

According to an embodiment of the invention, as shown in FIGS. 1 to 11, the second auxiliary chamber 56 is filled with a second compressible fluid (i.e. air or gas) acting as the second spring member.

Alternatively, as shown in FIG. 12, the second auxiliary chamber 56 contains a second elastic mechanical element 57, such as a coil spring. The second elastic mechanical element may also be a member of elastomeric material.

The arrangement is such that during the above-mentioned rebound phase, when the volume of the second working chamber 30 decreases as a result of rotation of the shaft 12 in the second direction, flow of the second working fluid from the second working chamber 30 to the second main chamber 54 causes the volume of the second main chamber 54 to increase and therefore the fourth piston 52 to move to the left (according to the point of view of a person looking at FIGS. 6 to 8) to reduce the volume of the second auxiliary chamber 56, thus compressing the second compressible fluid, or the second elastic mechanical element 57, contained therein.

According to another embodiment of the invention, as illustrated in the drawings, the damper 10 further comprises a fifth cylinder 58 interposed between the third cylinder 40 and the fourth cylinder 42 and formed by the tubular casing 44.

The fifth cylinder 58 is in communication with one of the third and fourth cylinders 40 or 42.

More specifically, in the embodiments illustrated herein, the fifth cylinder 58 communicates with the third cylinder 40 via an opening 60 provided in a wall 62 separating the fifth cylinder and the third cylinder, but the fifth cylinder does not communicate with the fourth cylinder 42, from which it is separated by a closed wall 64.

A fifth piston 66 is slidably arranged inside the fifth cylinder 58 to float therein depending on the resultant force acting on it. More specifically, the fifth piston 66 is subject to two forces directed in opposite directions. On the one hand, through the opening 60 provided in the wall 62 the fifth piston 66 is subject to an elastic force exerted by the first spring member (the first compressible fluid or the first elastic mechanical element 51) contained in the first auxiliary chamber 50 of the third cylinder 40. On the other hand, the fifth piston 66 is subject to an elastic force exerted by the third spring member contained in a chamber 67 (hereinafter referred to as third auxiliary chamber) defined between the fifth piston 66 and the wall 64. Advantageously, as shown in FIG. 6, in a middle position of the suspension arm 14 between the first and second positions, the third spring member applies onto the fifth piston 66 a force greater than the force applied by the first spring member, whereby the fifth piston 66 is held in contact with the wall 62 (i.e. in the leftmost position within the fifth cylinder 58, with respect to the point of view of a person looking at FIG. 6).

In the embodiment shown in FIGS. 1 to 11, the third spring member is formed by a third compressible fluid which fills the third auxiliary chamber 67 and may be the same fluid as the first compressible fluid and/or the second compressible fluid.

Advantageously, the pressure of the third compressible fluid in the third auxiliary chamber 67 is higher than the pressure of the first compressible fluid in the first auxiliary chamber 50. Therefore, due to the difference in pressure between the first auxiliary chamber 50 and the third auxiliary chamber 67, the fifth piston 66 is normally held in contact with the wall 62.

Alternatively, as shown in FIG. 12, the third spring member is formed by a third elastic mechanical element 69, such as a coil spring or a member of elastomeric material.

The damper 10 further comprises a first end tube 68 which is fixed to the end of the tubular casing 20 where the first cylinder 16 is placed, as well as to the end of the tubular casing 44 where the third cylinder 40 is placed, and defines a flow path for the first working fluid between the first working chamber 26 and the first main chamber 48.

A first flow control valve 70, preferably made as a manually-adjustable valve, is mounted in the first end tube 68 and allows to adjust the pressure drop of the first working fluid flowing from the first working chamber 26 to the first main chamber 48 during the compression phase, and vice versa from the first main chamber 48 to the first working chamber 26 during the rebound phase.

Figure 9:
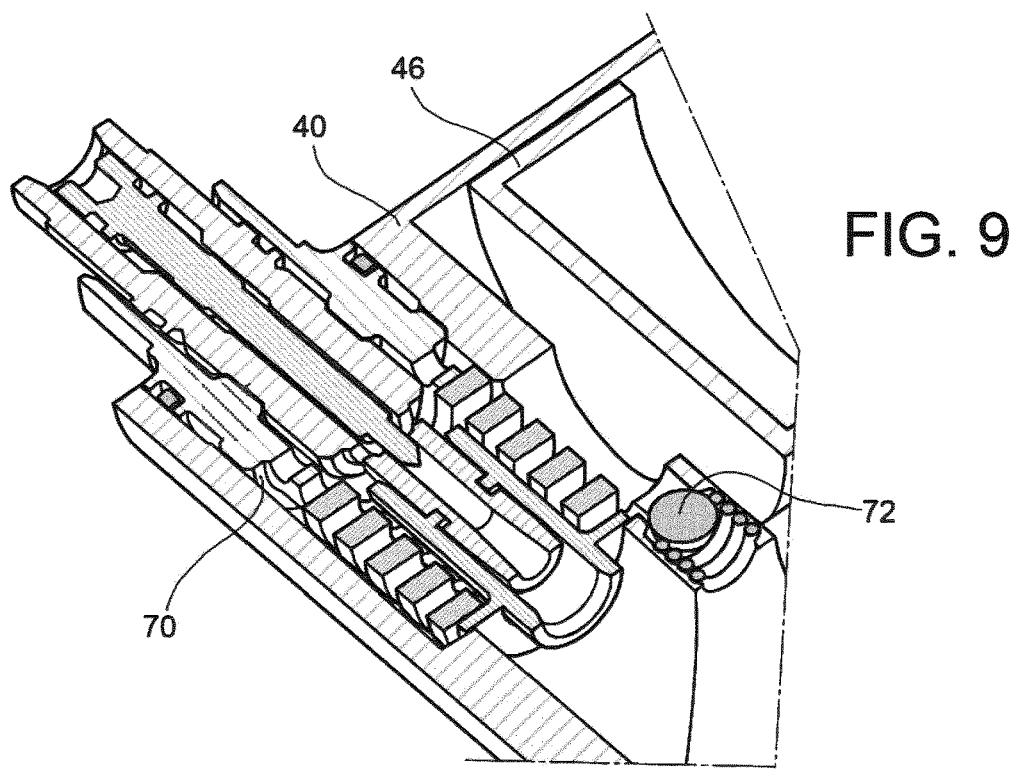
FIG. 9 is a perspective view showing in detail a first flow control valve of the rotary damper of FIG. 1, sectioned through a plane passing through its longitudinal axis.

The first flow control valve 70 may have the structure shown in detail in FIG. 9. With such a structure, the first flow control valve 70 allows three independent settings for the compression phase and three independent settings for the rebound phase. A different structure of the first flow control valve 70 may of course be envisaged. The first flow control valve 70 may be a traditional valve with clamped shim stack, or an electronically-controlled solenoid valve, instead of a manually-adjustable valve.

A first check valve 72 is also mounted in the first end tube 68, in parallel to the first flow control valve 70, and allows flow of the first working fluid only in the direction from the first main chamber 48 to the first working chamber 26 during the rebound phase. During the compression phase, therefore, the first working fluid is forced to flow from the first working chamber 26 to the first main chamber 48 passing only through the first flow control valve 70, whereas during the rebound phase the first working fluid can flow from the first main chamber 48 to the first working chamber 26 through the first flow control valve 70 and/or through the first check valve 72 depending on the settings of these two valves.

The damper 10 may further comprise a first energy harvesting device associated to the first working chamber 26 that generates power from the flow of the first working fluid, both when the first working fluid flows from the first working chamber 26 to the first main chamber 48 during the compression phase and when the first working fluid flows in the opposite direction, i.e. from the first main chamber 48 to the first working chamber 26, during the rebound phase.

In the illustrated embodiment, the first energy harvesting device comprises a first hydraulic motor 74 arranged in the flow path between the first working chamber 26 and the first main chamber 48, preferably with its axis of rotation parallel to the axis y, as well as a first electric machine 76 whose rotor is drivingly connected for rotation to the first hydraulic motor 74, in particular by a first transmission shaft 78. The architecture of the first hydraulic motor 74 is configured such that the first hydraulic motor is driven by the first working fluid into rotation in a given direction when the first working fluid flows from the first working chamber 26 to the first main chamber 48 during the compression phase, thereby causing rotation of the first transmission shaft 78, and hence of the rotor of the first electric machine 76, in the same direction.

The first hydraulic motor 74 may be positioned immediately downstream of the first check valve 72, so as to be driven into rotation by the first working fluid flowing through the first check valve 72 in the direction from the first main chamber 48 to the first working chamber 26 during the rebound phase. For simplicity, the first hydraulic motor 74 is only schematically shown in the drawings.

The damper 10 further comprises a second end tube 80 which is fixed to the end of the tubular casing 20 where the second cylinder 18 is placed, as well as to the end of the tubular casing 44 where the fourth cylinder 42 is placed, and defines a flow path for the second working fluid between the second working chamber 30 and the second main chamber 54.

A second flow control valve 82, preferably made as an electronically-controlled solenoid valve, is mounted in the second end tube 80 and allows to adjust the pressure drop of the second working fluid flowing from the second working chamber 30 to the second main chamber 54 during the rebound phase, and vice versa from the second main chamber 54 to the second working chamber 30 during the compression phase.

Figure 10:
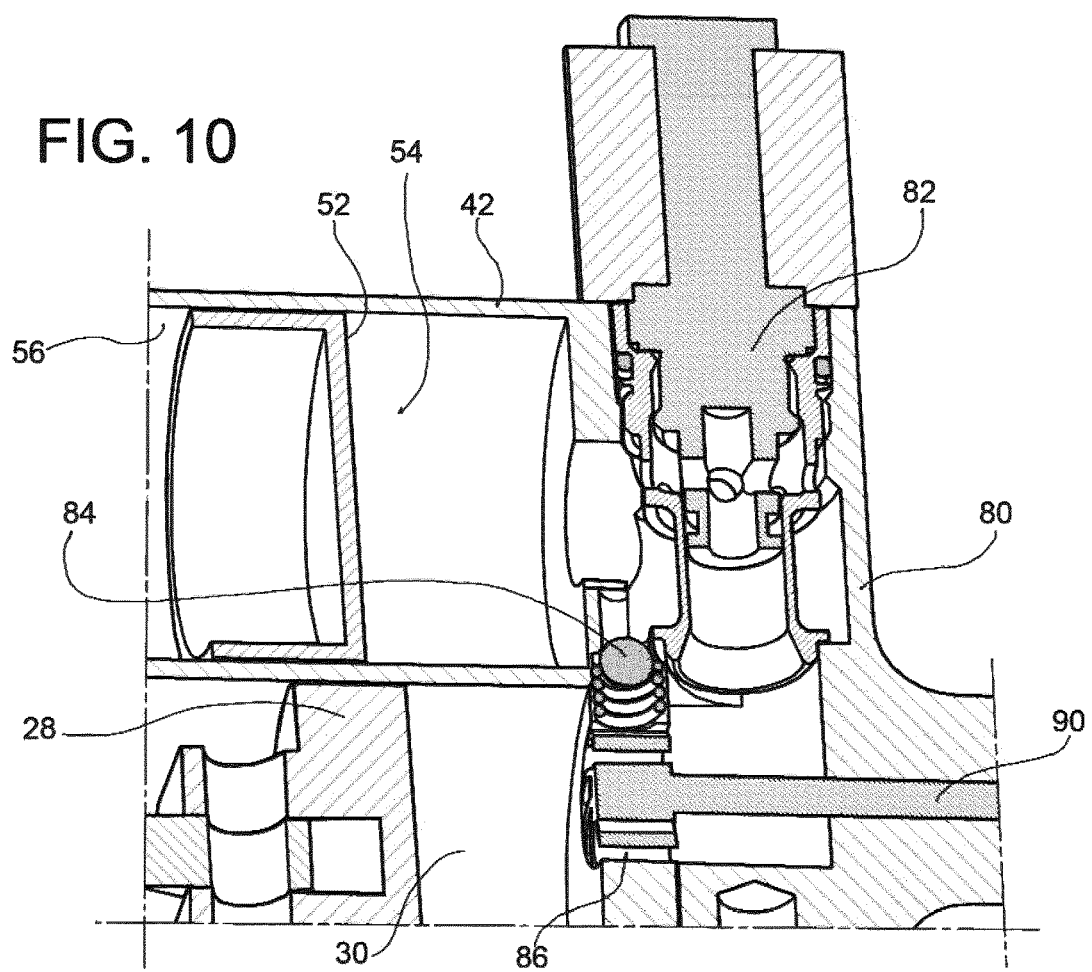
FIG. 10 is a perspective view showing in detail a second flow control valve of the rotary damper of FIG. 1, sectioned through a plane passing through its longitudinal axis.
Figure 11:
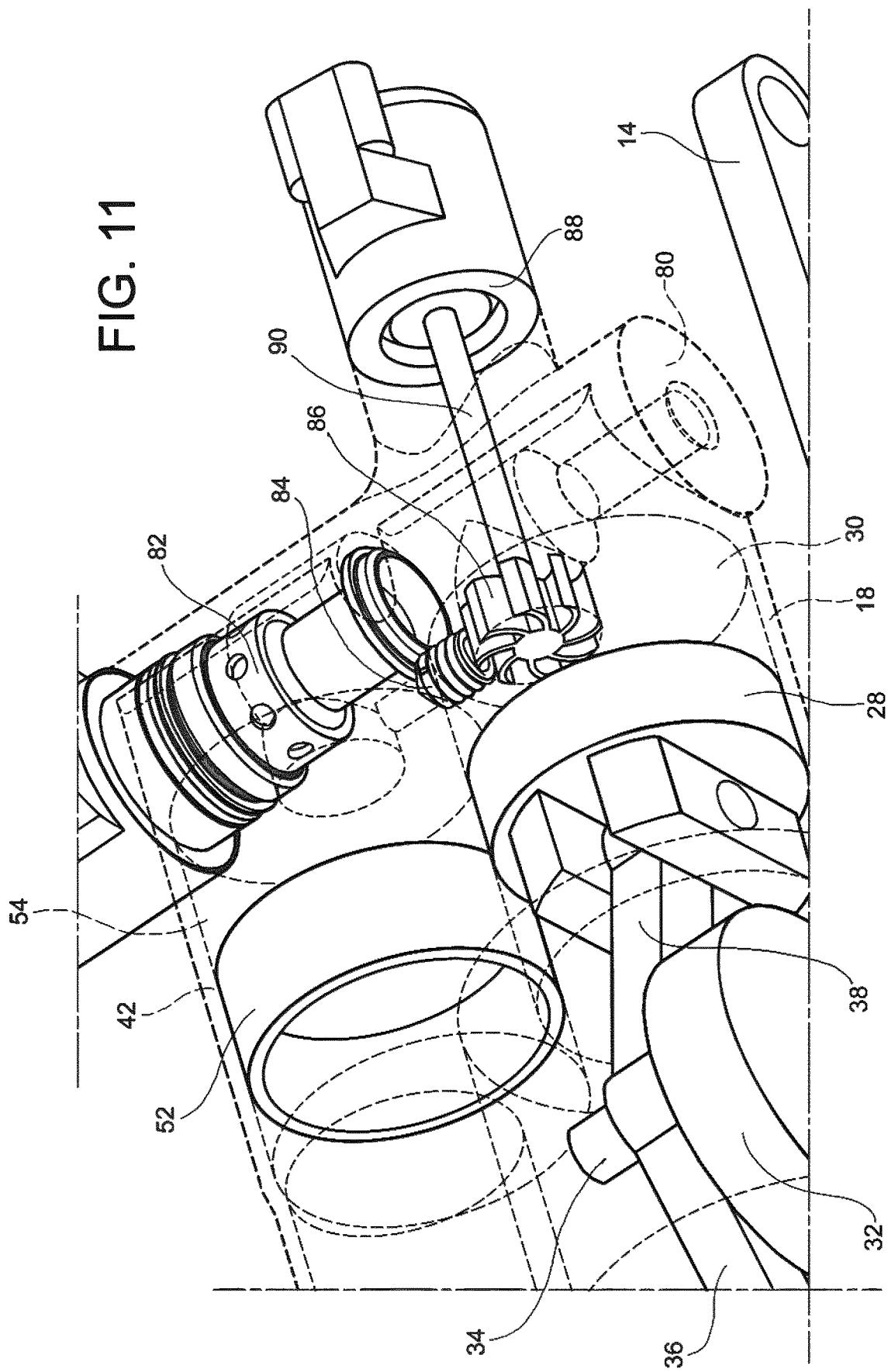
FIG. 11 is a perspective view, partially in phantom, showing in detail an energy harvesting device of the rotary damper of FIG. 1.

The second flow control valve 82 may have the structure shown in detail in FIG. 10. A different structure of the second flow control valve 82 may however be envisaged. The second flow control valve 82 may be a manually-adjustable valve, instead of an electronically-controlled solenoid valve, or it may contain restrictions for magneto-rheological or electrorheological fluids.

A second check valve 84 is also mounted in the second end tube 80, in parallel to the second flow control valve 82, and allows flow of the second working fluid only in the direction from the second main chamber 54 to the second working chamber 30 during the compression phase. During the rebound phase, therefore, the second working fluid is forced to flow from the second working chamber 30 to the second main chamber 54 passing only through the second flow control valve 82, whereas during the compression phase the second working fluid can flow from the second main chamber 54 to the second working chamber 30 through the second flow control valve 82 and/or through the second check valve 84 depending on the settings of these two valves.

The damper 10 may further comprise a second energy harvesting device associated to the second working chamber 30 that generates power from the flow of the second working fluid, both when the second working fluid flows from the second working chamber 30 to the second main chamber 54 during the rebound phase and when the second working fluid flows in the opposite direction, i.e. from the second main chamber 54 to the second working chamber 30, during the compression phase.

In the illustrated embodiment, the second energy harvesting device has substantially the same structure as the first energy harvesting device, with a second hydraulic motor 86 arranged in the flow path between the second working chamber 30 and the second main chamber 54, preferably with its axis of rotation parallel to the axis y and coaxial with that of the first hydraulic motor 74, as well as a second electric machine 88 whose rotor is drivingly connected for rotation to the second hydraulic motor 86, in particular by a second transmission shaft 90. The architecture of the second hydraulic motor 86 is configured such that the second hydraulic motor is driven by the second working fluid into rotation in a given direction when the second working fluid flows from the second working chamber 30 to the second main chamber 54 during the rebound phase, thereby causing rotation of the second transmission shaft 90, and hence of the rotor of the second electric machine 88, in the same direction.

The second hydraulic motor 86 may be positioned immediately downstream of the second check valve 84, so as to be driven into rotation by the second working fluid flowing through the second check valve 84 in the direction from the second main chamber 54 to the second working chamber 30 during the compression phase.

The first and second energy harvesting devices are thus able to convert part of the kinetic energy of the rotating mechanical member 14 (e.g. a suspension arm), whose rotation has to be dampened, into electric energy. Such electric energy can then be used at vehicle level, to recharge the vehicle battery, or locally to feed the control means of the electronically-controlled solenoid valves, if any, thus implementing a semi-active damping control which is autonomous from an energetic point of view.

The operation of the damper 10 will now be described with reference to FIGS. 6 to 8.

As shown in FIG. 7, during the compression phase, i.e. when the suspension arm 14 is rotated upwards and therefore the shaft 12 rotates in the first direction (counterclockwise direction), the first and second pistons 24 and 28 are moved synchronously by the motion transmission mechanism to the left (with respect to the point of view of a person looking at FIG. 7) starting from the middle position of FIG. 6. The resulting reduction in volume of the first working chamber 26 causes the first working fluid contained in this chamber to flow towards the first main chamber 48 of the third cylinder 40 passing through the first flow control valve 70 (as the first check valve 72 prevents fluid flow therethrough in this direction). The pressure drop caused by the fluid flow from the first working chamber 26 to the first main chamber 48 is determined by the first flow control valve 70, together with the setting of the first energy harvesting device, through the braking torque applied by the first electric machine 76 to the first hydraulic motor 74. As the first main chamber 48 is filled with the first working fluid coming from the first working chamber 26, the volume of the first main chamber 48 increases and therefore the third piston 46 moves to the right, i.e. towards the wall 62. The first compressible fluid contained in the first auxiliary chamber 50 is thus compressed and the pressure force it applies onto the fifth piston 66 increases. When this pressure force becomes higher than the pressure force applied on the fifth piston 66 by the third compressible fluid contained in the third auxiliary chamber 67, then the fifth piston 66 moves to the right, thereby further compressing the third compressible fluid contained in the third auxiliary chamber 67.

At the same time, movement of the second piston 28 to the left causes an increase in volume of the second working chamber 30. Therefore, the second working fluid contained in the second main chamber 54 of the fourth cylinder 42 is forced to flow towards the second working chamber 30 passing through the second flow control valve 82 and/or the second check valve 84 depending on the settings of these two valves. As the second working fluid flows out of the second main chamber 54, the volume of this chamber decreases and therefore the fourth piston 52 is caused to move to the right, i.e. away from the wall 64.

As shown in FIG. 8, during the rebound phase, i.e. when the suspension arm 14 is rotated downwards and therefore the shaft 12 rotates in the second direction (clockwise direction), the first and second pistons 24 and 28 are moved synchronously by the motion transmission mechanism to the right (with respect to the point of view of a person looking at FIG. 8) starting from the middle position of FIG. 6. The resulting reduction in volume of the second working chamber 30 causes the second working fluid contained in this chamber to flow towards the second main chamber 54 of the fourth cylinder 42 passing through the second flow control valve 82 (as the second check valve 84 prevents fluid flow therethrough in this direction). The pressure drop caused by the fluid flow from the second working chamber 30 to the second main chamber 54 is determined by the second flow control valve 82, together with the setting of the second energy harvesting device, through the braking torque applied by the second electric machine 88 to the second hydraulic motor 86. As the second main chamber 54 is filled with the second working fluid coming from the second working chamber 30, the volume of the second main chamber 54 increases and therefore the fourth piston 52 moves to the left, i.e. towards the wall 64, thus compressing the second compressible fluid contained in the second auxiliary chamber 56 of the fourth cylinder 42.

At the same time, movement of the first piston 24 to the right causes an increase in volume of the first working chamber 26. Therefore, the first working fluid contained in the first main chamber 48 of the third cylinder 40 is forced to flow towards the first working chamber 26 passing through the first flow control valve 70 and/or the first check valve 72 depending on the settings of these two valves. As the first working fluid flows out of the first main chamber 48, the volume of this chamber decreases and therefore the third piston 46 is caused to move to the left, i.e. away from the wall 62, while the fifth piston 66 also moves to the left until it comes in contact with the wall 62.

During both the compression phase and the rebound phase the flow of the first working fluid from the first working chamber 26 to the first main chamber 48 of the third cylinder 40 and vice versa may be used to generate power by the first energy harvesting device. Likewise, during both the rebound phase and the compression phase the flow of the second working fluid from the second working chamber 30 to the second main chamber 54 of the fourth cylinder 42 and vice versa may be used to generate power by the second energy harvesting device.

By connecting the auxiliary chambers 50, 56 and 67 to a pneumatic circuit (not shown), comprising a pneumatic compressor and a suitable set of pneumatic valves, it would also be possible to vary the pressures of the three compressible fluids contained inside these chambers. In this way, in case of application of the device to a vehicle suspension, it would also be possible to vary the vehicle ride height.

As already mentioned above, in the embodiment of FIG. 12, where parts and elements identical or corresponding to those of FIGS. 1 to 11 are indicated with the same reference numerals, the damper 10 has a first elastic mechanical element 51 acting as first spring member, a second elastic mechanical element 57 acting as second spring member and a third elastic mechanical element 69 acting as third spring member.

More specifically, in the embodiment illustrated in FIG. 12 the first, second and third elastic mechanical elements 51, 57 and 69 are all made as coil springs. The coil spring forming the first elastic mechanical element 51 is arranged in the first auxiliary chamber 50 and abuts at one end thereof (left-hand end) against the third piston 46 and at the opposite end (right-hand end), through the opening 60, against the fifth piston 66. The coil spring forming the second elastic mechanical element 57 is arranged in the second auxiliary chamber 56 and abuts at one end thereof (left-hand end) against the wall 64 and at the opposite end (right-hand end) against the fourth piston 52. Finally, the coil spring forming the third elastic mechanical element 69 is arranged in the third auxiliary chamber 67 and abuts at one end thereof (left-hand end) against the fifth piston 66 and at the opposite end (right-hand end) against the wall 64.

Apart from that, the structure and operation of the damper according to the embodiment of FIG. 12 are the same as those of the damper according to the embodiment described above with reference to FIGS. 1 to 11.

Figure 13:
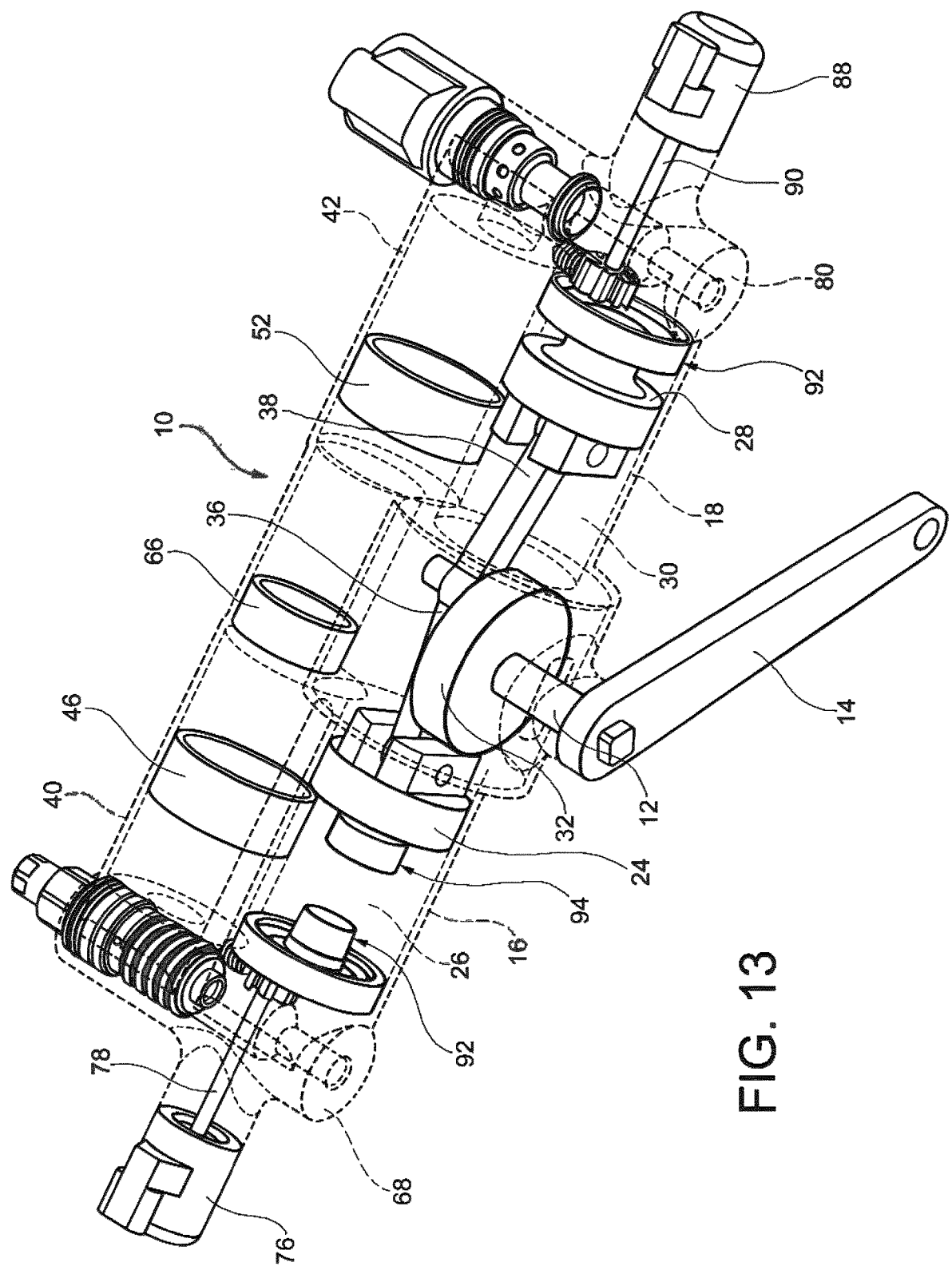
FIG. 13 is a perspective view, partially in phantom, of a rotary damper according to still another embodiment of the present invention.
Figure 14A:
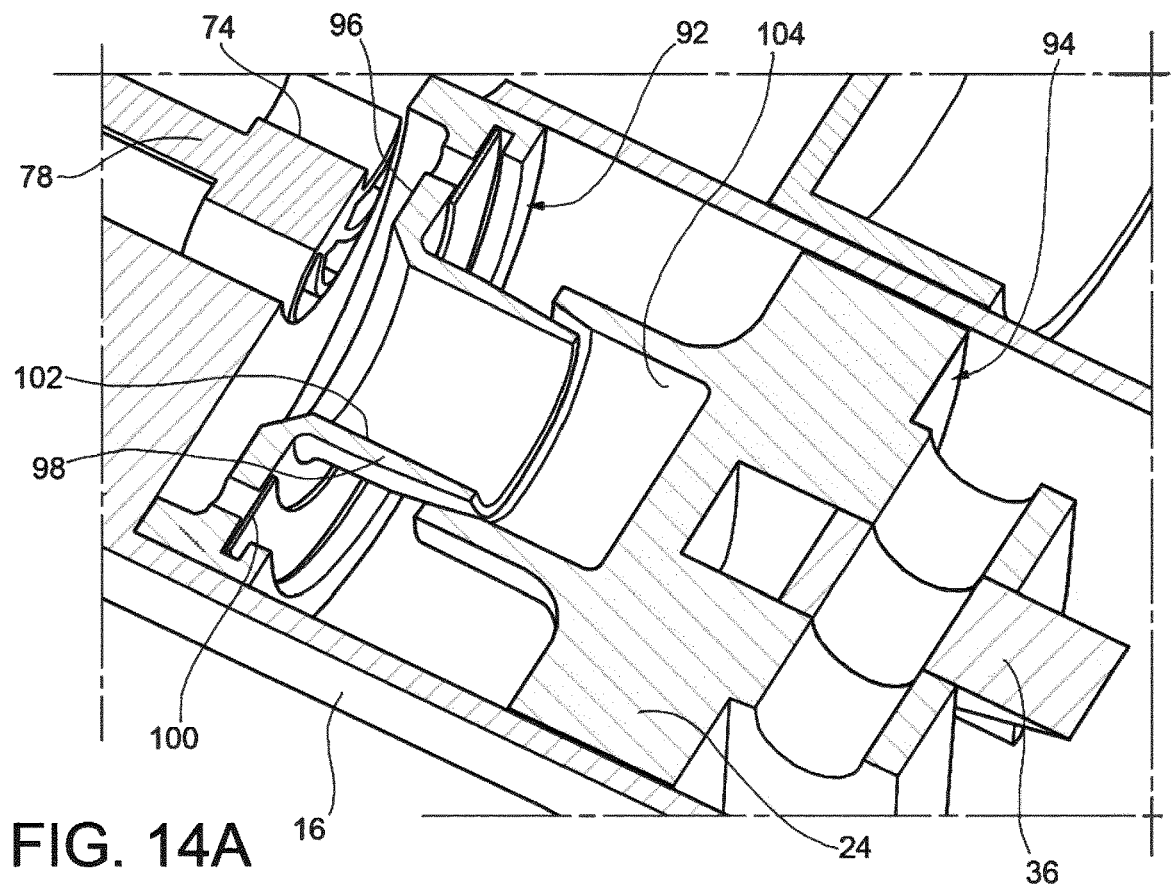
FIG. 14A is a cutaway view from above, on enlarged scale, showing in detail a compression hydraulic bump stop of the rotary damper of FIG. 13, in an intermediate position of the compression travel.
Figure 14B:
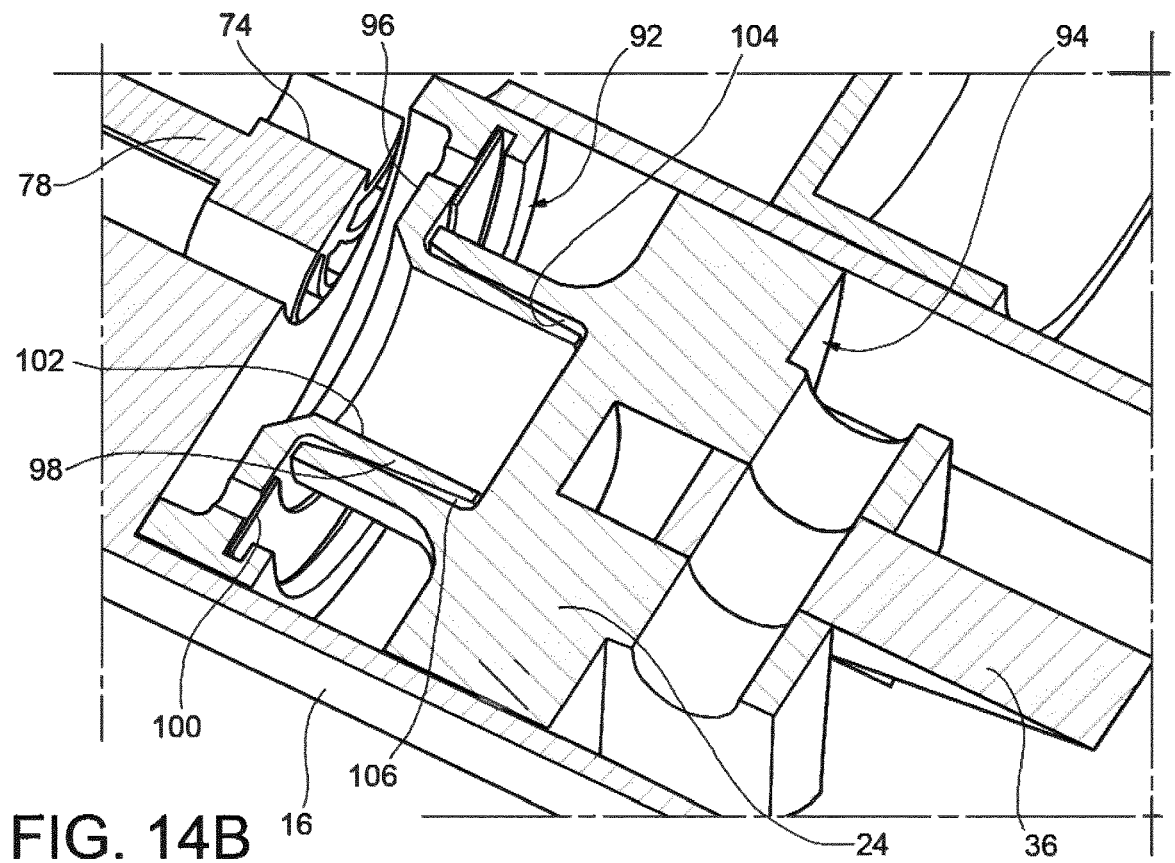
FIG. 14B is a cutaway view from above, on enlarged scale, showing in detail a compression hydraulic bump stop of the rotary damper of FIG. 13, at the end of the compression travel.

With reference now to FIGS. 13, 14A and 14B, where parts and elements identical or corresponding to those of FIGS. 1 to 11 are indicated with the same reference numerals, a further embodiment of a rotary damper according to the invention will be described.

This further embodiment differs from the embodiment of FIGS. 1 to 11 in that the damper 10 further comprises a first hydraulic bump stop arranged in the first working chamber 26 to act during the compression phase in such a manner as so as to hydraulically dissipate the kinetic energy of the first piston 24, and therefore the kinetic energy of the suspension arm 14, during the last portion of this phase, as well as a second hydraulic bump stop arranged in the second working chamber 30 to act during the rebound phase in such a manner as so as to hydraulically dissipate the kinetic energy of the second piston 28, and therefore the kinetic energy of the suspension arm 14, during the last portion of this phase.

Although in the illustrated embodiment the damper 10 comprises both the first hydraulic bump stop and the second hydraulic bump stop, it is also possible for the damper to be provided with only one of the first and second hydraulic bump stops.

As shown in greater detail in FIGS. 14A and 14B (which show in particular the first hydraulic bump stop, but the same applies to the second hydraulic bump stop), each of the first and second hydraulic bump stops basically comprises a male part 92 and a cooperating female part 94.

The male part 92 is arranged on the bottom side of the respective working chamber (first working chamber 26 for the first hydraulic bump stop and second working chamber 30 for the second hydraulic bump stop), i.e. on the side of the respective working chamber away from the respective piston (first piston 24 and second piston 28, respectively). The male part 92 is a disc-shaped member having an annular flange portion 96 and a central protruding portion 98 protruding axially from the annular flange portion 96 towards the respective piston (first piston 24 or second piston 28).

The annular flange portion 96 is provided with a check valve 100 that allows flow of the first working fluid only in the direction from the first main chamber 48 to the first working chamber 26, as far as the first hydraulic bump stop is concerned, and, likewise, to allow flow of the second working fluid only in the direction from the second main chamber 54 to the second working chamber 30, as far as the second hydraulic bump stop is concerned.

The central protruding portion 98 has a hole 102 extending therethrough. The central protruding portion 98 may have a frustoconical shape, tapered towards the respective piston 24 or 28.

The female part 94 is attached to the side of the respective piston 24 or 28 opposite to the respective connecting rod 36 or 38, so as to move as a single piece with the respective piston along the axis y.

The female part 94 has a cylindrical seat 104 that is open towards the central protruding portion 98 of the respective male part 92 and receives the whole central protruding portion 98 of the respective male part 92 when the damper is at the end of the compression phase (as shown in FIG. 14B) or at the end of the rebound phase, with a small annular gap 106 between the outer lateral surface of the central protruding portion 98 and the inner lateral surface of the seat 104. In case of a central protruding portion 98 having a frustoconical shape, as in the illustrated embodiment, the radial size of the annular gap 106 does not remain constant, but becomes progressively smaller the farther the central protruding portion 98 enters the seat 104.

With reference to FIGS. 14A and 14B, the operation of the first hydraulic bump stop during the compression phase (but the same applies to the second hydraulic bump stop during the rebound phase) is as follows.

As long as the central protruding portion 98 of the male part 92 does not enter the seat 104 of the female part 94, the first working fluid is free to flow out of the first working chamber 26 towards the first main chamber 48, passing through the hole 102 in the central protruding portion 98, with substantially no flow restriction. Once the central protruding portion 98 of the male part 92 starts entering the seat 104 of the female part 94, the first working fluid is forced to flow through the annular gap 106, before reaching the hole 102 and flowing therethrough towards the first main chamber 48, thereby causing a flow restriction and dissipating energy.

When the direction of movement of the first piston 24 changes, flow of the first working fluid from the first main chamber 48 to the first working chamber 26 takes place, at least in an initial phase (namely, as long as the central protruding portion 98 of the male part 92 is within the seat 104 of the female part 94), through the check valve 100, with substantially no flow restriction.

Apart from that, the structure and operation of the damper according to the embodiment of FIGS. 13, 14A and 14B are the same as those of the damper according to the embodiment described above with reference to FIGS. 1 to 11.

According to a further embodiment, not shown in the drawings, the fifth cylinder, along with the fifth piston and the third auxiliary chamber, is missing and the first and second auxiliary chambers are in communication with each other. In this case, the same spring member acts at the same time as the first spring member applying an elastic force onto the third piston and as the second spring member applying an elastic force onto the fourth piston. In other words, the first spring member coincides with the second spring member. The first and second auxiliary chambers may be in fluid communication with each other and contain the same compressible fluid acting at the same time as first and second spring members.

With a damper according to the present invention the following advantages may be obtained.

First of all, the rotary damper according to the invention allows to obtain an easy and complete filling of all the working volumes containing the first and second working fluids (i.e. the first and second working chambers 26 and 30, and the first and second main chambers 48 and 54).

Furthermore, a spring effect can be given to the rotary damper of the invention, by suitably setting the pressure levels of the first and second compressible fluids contained in the first and second auxiliary chambers 50 and 56, or by suitably setting the stiffnesses of the coil springs 51 and 57 acting on the third and fourth pistons 46 and 52.

Moreover, a double spring effect can be given to the rotary damper of the invention, depending on the amplitude of the rotation of the rotating input member, thanks to the presence of the third auxiliary chamber 67 separated from the first auxiliary chamber 50 by the fifth piston 66 slidably arranged inside the fifth cylinder 58. Since the initial pressure of the third compressible fluid contained in the third auxiliary chamber 67 is higher than the initial pressure of the first compressible fluid contained in the first auxiliary chamber 50, this solution allows to have only one gas spring active (i.e. the first auxiliary chamber 50 with the first compressible fluid contained therein) as long as the fifth piston 66 remains in contact with the wall 62, which condition occurs as long as the amplitude of the rotation of the rotating input member remains lower than a certain threshold, and two gas springs in series (i.e. the first auxiliary chamber 50 with the first compressible fluid contained therein, together with the third auxiliary chamber 67 with the third compressible fluid contained therein) as soon as the fifth piston 66 starts moving away from the wall 62, which condition occurs as soon as the amplitude of the rotation of the rotating input member becomes higher than the above-mentioned threshold. This may be useful when the rotary damper is installed in vehicle suspensions, since it generates a significant stiffness around the static configuration of the suspensions, thus acting as an anti-roll device, without generating excessive spring forces at the end of the strokes, thus improving the passenger comfort in case of shocks.

Finally, by connecting a pneumatic compressor and a suitable set of pneumatic valves to the rotary damper, it is also possible to vary the pressure in the auxiliary chambers. In this way, in case of application of the rotary damper to vehicle suspensions, it is also possible to vary the vehicle ride height.

The principle of the invention remaining unchanged, the embodiments and the constructional details may be varied with respect to those described and illustrated by way of non-limiting example, without thereby departing from the scope of protection as described and claimed herein.

A variant embodiment may also be envisaged wherein the fifth cylinder 58 is missing and the wall 62 (which in the illustrated embodiment has an opening 60 to allow communication between the third cylinder 40 and the fifth cylinder 58) is closed.

The invention claimed is:

1. A rotary damper comprising:
a rotating input member rigidly connected to a rotating mechanical member to rotate with the rotating mechanical member about an axis of rotation;
a first cylinder and a second cylinder coaxially arranged on opposite sides of the axis of rotation;
a first piston slidably mounted inside the first cylinder and defining with the first cylinder a first working chamber containing a first incompressible working fluid;
a second piston slidably mounted inside the second cylinder and defining with the second cylinder a second working chamber containing a second incompressible working fluid;
motion conversion mechanisms arranged between the rotating input member and the first and second pistons to convert a rotary motion of the rotating input member about the axis of rotation into reciprocating motion of the first and second pistons in phase with each other, whereby as a result of the rotary motion of the rotating input member in a first direction about the axis of rotation a volume of the first working chamber is reduced and a volume of the second working chamber is increased, while as a result of the rotary motion of the rotating input member in a second direction, opposite to the first direction, about the axis of rotation the volume of the first working chamber is increased while the volume of the second working chamber is reduced;
a third cylinder;
a fourth cylinder;
a third piston which is slidably arranged inside the third cylinder and separates an inner volume of the third cylinder into a first main chamber, which is in fluid communication with the first working chamber and is filled with the first incompressible working fluid, and a first auxiliary chamber, wherein the first auxiliary chamber contains a first spring member arranged to apply onto the third piston a first elastic force acting against a first pressure force applied onto the third piston by pressure of the first incompressible working fluid in the first main chamber, and wherein the third piston is a floating piston sliding inside the third cylinder depending on a resultant force between said first elastic force and first pressure force applied onto the third piston, whereby when the volume of the first working chamber decreases, as a result of rotation of the rotating input member in the first direction, the third piston is caused to move to reduce the volume of the first auxiliary chamber, compressing the first spring member contained therein and increasing the first elastic force applied by the first spring member onto the third piston; and
a fourth piston which is slidably arranged inside the fourth cylinder and separates an inner volume of the fourth cylinder into a second main chamber, which is in fluid communication with the second working chamber and is filled with the second incompressible working fluid, and a second auxiliary chamber, wherein the second auxiliary chamber contains a second spring member arranged to apply onto the fourth piston a second elastic force acting against a second pressure force applied onto the fourth piston by pressure of the second incompressible working fluid in the second main chamber, and wherein the fourth piston is a floating piston sliding inside the fourth cylinder depending on a resultant force between said second elastic force and second pressure force applied onto the fourth piston, whereby when the volume of the second working chamber decreases, as a result of rotation of the rotating input member in the second direction, the fourth piston is caused to move to reduce the volume of the second auxiliary chamber, compressing the second spring member contained therein and increasing the second elastic force applied by the second spring member onto the fourth piston;
the first working chamber and the second working chamber being fluidically separated from each other and the first auxiliary chamber and the second auxiliary chamber being fluidically separated from each other, as well as from the first working chamber and the second working chamber, whereby said first incompressible working fluid is prevented from flowing from said first working chamber to said second working chamber and to said first auxiliary chamber and second auxiliary chamber, and whereby said second incompressible working fluid is prevented from flowing from said second working chamber to said first working chamber and to said first auxiliary chamber and second auxiliary chamber.

2. The rotary damper as set forth in claim 1, wherein a same incompressible fluid is used as first incompressible working fluid filling the first working chamber and the first main chamber and as second incompressible working fluid filling the second working chamber and the second main chamber.

3. The rotary damper as set forth in claim 1, wherein the first spring member is formed by a first compressible fluid filling the first auxiliary chamber.

4. The rotary damper as set forth in claim 1, wherein the first spring member is formed by at least one first elastic mechanical element, including a coil spring.

5. The rotary damper as set forth in claim 1, wherein the second spring member is formed by a second compressible fluid filling the second auxiliary chamber.

6. The rotary damper as set forth in claim 1, wherein the second spring member is formed by at least one second elastic mechanical element, including a coil spring.

7. The rotary damper as set forth in claim 3, further comprising pressure adjusting devices to adjust pressure of the first compressible fluid in the first auxiliary chamber.

8. The rotary damper as set forth in claim 1, further comprising:
a fifth cylinder communicating with the first auxiliary chamber of the third cylinder
a fifth piston which is slidably arranged inside the fifth cylinder and encloses with the fifth cylinder a third auxiliary chamber; and
a third spring member contained in the third auxiliary chamber and arranged to apply onto the fifth piston a third elastic force acting against a fourth elastic force applied onto the fifth piston by the first spring member contained in the first auxiliary chamber,
wherein the fifth piston is a floating piston sliding inside the fifth cylinder depending on a resultant force between said third elastic force and fourth elastic force applied onto the fifth piston.

9. The rotary damper as set forth in claim 8, wherein the third spring member is formed by a third compressible fluid filling the third auxiliary chamber.

10. The rotary damper as set forth in claim 3, wherein the second spring member is formed by a second compressible fluid filling the second auxiliary chamber, wherein a third spring member, contained in a third auxiliary chamber and arranged to apply onto a fifth piston a third elastic force acting against a fourth elastic force applied onto the fifth piston by the first spring member contained in the first auxiliary chamber, is formed by a third compressible fluid filling the third auxiliary chamber, and wherein a same compressible fluid is used as first compressible fluid filling the first auxiliary chamber, as second compressible fluid filling the second auxiliary chamber and as third compressible fluid filling the third auxiliary chamber.

11. The rotary damper as set forth in claim 7, wherein the second spring member is formed by a second compressible fluid filling the second auxiliary chamber, wherein a third spring member, contained in a third auxiliary chamber and arranged to apply onto a fifth piston a third elastic force acting against a fourth elastic force applied onto the fifth piston by the first spring member contained in the first auxiliary chamber, is formed by a third compressible fluid filling the third auxiliary chamber, and wherein said pressure adjusting devices are also arranged to adjust pressure of the second compressible fluid in the second auxiliary chamber and of the third compressible fluid in the third auxiliary chamber.

12. The rotary damper as set forth in claim 1, further comprising a first flow control valve for controlling flow of the first incompressible working fluid between the first working chamber and the first main chamber and/or a second flow control valve for controlling flow of the second incompressible working fluid between the second working chamber and the second main chamber.

13. The rotary damper as set forth in claim 1, further comprising a first energy harvesting device that generates power from flow of the first incompressible working fluid between the first working chamber and the first main chamber.

14. The rotary damper as set forth in claim 1, further comprising a first hydraulic bump stop arranged in the first working chamber to hydraulically dissipate the kinetic energy of the first piston when the first piston is moved to compress the first incompressible working fluid in the first working chamber.

15. The rotary damper as set forth in claim 1, wherein the first auxiliary chamber and the second auxiliary chamber are in communication with each other and wherein the first spring member coincides with the second spring member.

16. The rotary damper as set forth in claim 5, further comprising pressure adjusting devices to adjust pressure of the second compressible fluid in the second auxiliary chamber.

17. The rotary damper as set forth in claim 8, wherein the third spring member is formed by at least one third elastic mechanical element, including a coil spring.

18. The rotary damper as set forth in claim 1, further comprising a second energy harvesting device that generates power from flow of the second incompressible working fluid between the second working chamber and the second main chamber.

19. The rotary damper as set forth in claim 1, further comprising a second hydraulic bump stop arranged in the second working chamber to hydraulically dissipate the kinetic energy of the second piston when the second piston is moved to compress the second working fluid in the second working chamber.

* * * * *